2,732,354

CHLORINE DERIVATIVES OF ISOOLEFIN-POLYOLEFIN POLYMERS AND COMPOSITIONS COMPRISING THE SAME

Richard T. Morrissey, Cuyahoga Falls, and Marvin R. Frederick, Wadsworth, Ohio, assignors to The B. F. Goodrich Company, New York, N. Y., a corporation of New York No Drawing. Application December 5, 1952,
Serial No. 324,412

10 Claims. (Cl. 260—5)

This invention relates to novel materials of the class characterized as being chlorine-containing derivatives of isoolefin-polyolefin interpolymers, and it relates particularly to rubbery materials of this class; to the preparation thereof; and to compositions comprising these materials together with other materials, particularly other rubbery materials such as natural rubber and synthetic rubbers.

Synthetic rubbers containing a major proportion of an olefin such as isobutylene and a minor proportion of one or more polyolefinic hydrocarbons such as the conjugated dienes represented by isoprene are well known. Such interpolymers are characterized by having a high molecular weight, a low degree of unsaturation and slow reactivity with curing or vulcanizing agents such as sulfur to obtain elastic products. The presently best known examples of such interpolymers are the copolymers of isobutylene with a small proportion of isoprene known to the rubber industry as Butyl or GR–I rubber.

Butyl rubber has been used widely in the manufacture of inner tubes, but certain inherent disadvantages of the polymer have prevented more widespread use. For example, Butyl rubber cures more slowly with sulfur than than other useful sulfur vulcanizable rubbers; it does not adhere well to other materials such as natural rubber; when it is mixed with natural rubber and the mixture is vulcanized, the resulting vulcanizates are generally less useful and valuable than vulcanizates from either of these rubbery materials alone. One way to overcome the disadvantages of Butyl rubbers is to brominate the polymer as disclosed in a copending application of Richard A. Crawford and Richard T. Morrissey, Serial Number 156,724, filed April 18, 1950, now U. S. Patent No. 2,631,984.

We have now found that the introduction of small and critical amounts of chlorine atoms into the polymer structure of Butyl rubber and similar isoolefin-polyolefin interpolymers by reaction of such a polymer with a chlorinating agent at a temperature below 0° C., so as to produce a controlled number of units of the structure

results in new materials with properties unexpectedly superior to those of the chlorine-free polymers. Thus, we have found that chlorinated rubbery isoolefin-polyolefin interpolymers prepared in this way to contain from 0.4 to 2.3 weight percent chlorine possess the property of being cured or vulcanized quite rapidly, even with vulcanizing agents which are ineffective with the non-chlorinated materials, to yield vulcanized products which far surpass those obtained from the non-chlorinated materials in a number of respects including better aging properties, and which are fully equal or superior to the vulcanizates from the non-chlorinated materials in other respects such as tensile strength and elasticity, low temperature flexibility and resistance to air-diffusion. In addition, such chlorinated interpolymers, unlike the non-chlorinated materials, adhere well to a variety of materials including natural and synthetic rubbers and are therefore of great value as adhesives.

We have also found that such chlorine-containing interpolymers may be mixed with natural rubber or any of the various known synthetic rubbers in any desired proportions and that the resulting mixtures may be covulcanized to obtain products of excellent properties. Mixtures of Butyl rubber with small amounts of natural rubber cannot be vulcanized to a state of appreciable strength, but similar mixtures of natural rubber and chlorinated interpolymers of the type described can be vulcanized to obtain products having good tensile strength and other excellent properties. Similarly, small amounts of such chlorinated interpolymers remarkably improve other properties of natural vulcanizates when mixed with them, whereas non-chlorinated interpolymers so used in natural rubber act only as inert fillers with no significant improvement in properties of the original rubber.

The chlorine-containing isoolefin-polyolefin interpolymers of this invention are prepared, according to our procedure, by reacting an isoolefin-polyolefin hydrocarbon interpolymer with a chlorinating agent at a temperature of less than 0° C. to obtain a polymer containing from 0.4 to 2.3 weight percent of combined chlorine. Since the reaction which occurs involves an addition of chlorine to olefinic double bonds, the isoolefin-polyolefin interpolymer used must, and will of course, contain olefinic unsaturation, but its nature may be otherwise varied quite widely.

Preferred isoolefin-polyolefin interpolymers for use in preparing the chlorinated derivatives are the solid, plastic, rubbery interpolymers containing a major proportion, desirably from 70 to 99 weight percent, of an isoolefin generally containing from 4 to 8 carbon atoms such as, most desirably, isobutylene or, alternatively, 3-methyl-butene-1, 4-methyl-pentene-1, 2-ethyl-butene-1, 4-ethyl-pentene-1 or the like or a mixture of such isoolefins, with a minor proportion, desirably from 1 to 30 weight percent, of a polyolefinic hydrocarbon generally containing from 4 to 18 carbon atoms, or two, three or more such hydrocarbons, including the following:

(1) preferably acyclic or open-chain conjugated diolefins such as butadiene-1,3, isoprene, 2,4-dimethylbutadiene-1,3, piperylene, 3-methyl-pentadiene-1,3, hexadiene-2,4, 2-neopentyl-butadiene-1,3, and the like;

(2) acyclic non-conjugated diolefins such as dimethallyl and its homologs containing 2 to 6 carbon atoms interposed between the two isopropenyl radicals, 2-methylhexadiene-1,5, 2-methyl-pentadiene-1,4, 2-methyl-heptadiene-1,6, 2-methyl-heptadiene-1,4 and other tertiary non-conjugated diolefins having one double bond in the terminal position attached to a tertiary carbon atom;

(3) alicyclic diolefins, both conjugated and non-conjugated such as cyclopentadiene, cyclohexadiene, 1-vinyl-cyclohexene-3, 1-vinyl-cyclohexene-1, 1-vinyl-cyclopentene-1, 1-vinyl-cyclobutene-2, dicyclopentadiene, and the like as well as monocyclic diolefinic terpenes such as dipentene, terpinenes, terpinolene, phellandrenes, sylvestrene and the like;

(4) acyclic triolefins such as 2,6-dimethyl-4-methyleneheptadiene-2,5, 2-methyl-hexatriene-1,3,5 and other conjugated triolefins, as well as myrcene, ocimene, alloocimene and the like;

(5) alicyclic triolefins such as fulvene, 6,6-dimethylfulvene, 6,6-methyl-ethyl-fulvene, 6-ethyl-fulvene, 6,6-diphenyl-fulvene, 6-phenyl-fulvene and other fulvenes of the formula

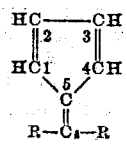

wherein each R is hydrogen, alkyl, cycloalkyl or aryl; as well as other alicyclic triolefins such as 1,3,3-trimethyl-6-vinyl-cyclohexadiene-2,4, cycloheptatriene etc.;

(6) higher polyolefins such as 6,6-vinyl-methyl-fulvene (a tetraolefin) and 6,6-diisopropenyl-fulvene (a pentaolefin); and, (7) polyolefinic hydrocarbons containing aromatic nuclei such as the phenyl butadienes, divinyl benzenes, diallyl benzenes, vinyl allyl benzene and divinyl naphthalenes.

The preferred solid, plastic, rubbery interpolymers for use in preparing chlorinated derivatives, are generally themselves prepared by low temperature (temperatures range from 0° C. to as low as −165° C. but are generally about −100° C.) interpolymerization reaction utilizing an appropriate catalyst, generally an active metal halide or Friedel-crafts type catalyst such as aluminum chloride or boron trifluoride, dissolved in a solvent with a low freezing point such as methyl or ethyl chloride, and when so prepared, generally possess an average molecular weight above 15,000 and usually as high as 200,000 or higher, iodine numbers in the range of 0.5 to 50, and are reactive with sulfur to yield elastic products on suitable heating. Of the preferred interpolymers, we find it most desirable in preparing the chlorinated derivatives of this invention to utilize the solid, plastic interpolymers of isobutylene with small amounts of isoprene or butadiene, of the character of Butyl rubbers which contain about 90 to 99 weight percent of isobutylene and 1 to 10 weight percent of aliphatic conjugated diolefin and preferably containing less than 5 weight percent of aliphatic conjugated diolefin.

It is to be understood that in addition to the preferred materials set forth above, any of the other known isoolefin-polyolefin interpolymers may also be utilized to prepare chlorinated derivatives having desirable properties not possessed by the non-chlorinated interpolymers. For example, plastic interpolymers of low molecular weight and/or not readily vulcanizable with sulfur, yield, in accordance with this invention, chlorinated derivatives which possess enhanced adhesive properties entirely unexpected from the low concentration of bound chlorine employed, and the ability to be used advantageously in compounding rubbery materials. Similarly, isoolefin-polyolefin interpolymers containing other interpolymerized monomers such as styrene, chlorostyrene, acrylyl chloride, metallyl chloride and other monoolefinic monomers are also advantageously used to prepare similar chlorinated interpolymer derivatives. To illustrate, a chlorinated interpolymer of 70% isobutylene, 15% styrene and 15% isoprene is superior to the corresponding non-chlorinated interpolymer as an adhesive and in the compounding of rubbery materials.

In preparing the chlorine-containing derivatives of this invention by the chlorination procedure, there may be used any desired chlorinating agent. Molecular chlorine itself is preferred, but any of the compounds of chlorine which liberate molecular chlorine at the temperature of reaction employed, below 0° C., may be employed. Included are such compounds as sodium hypochlorite, phosphorous pentachloride, N-chlorimide, N-chloramide and the like.

The chlorination reaction may be carried out in any desired manner as long as it is conducted at a temperature below 0° C. and the amount of chlorine which is added to the polymer is controlled so as to obtain a polymer containing an amount of chlorine within the limits set forth. One method consists in preparing a solution, dispersion or cement of the interpolymer in an appropriate normally liquid organic solvent or diluent such as a hydrocarbon or halogenated derivative thereof (examples of which are toluene, chlorobenzene, butane, hexane, heptane, ethyl chloride, trichloroethane, carbon tetrachloride etc.) and adding the chlorinating agent either as such or in solution to the interpolymer solution, dispersion or cement, thereby to form the chlorinated interpolymer in solution or dispersion in the solvent or diluent. The resulting solution or dispersion may be utilized as such, as, for example, when the chlorinated derivative is employed as an adhesive, or it may be mixed with a non-solvent for the chlorinated interpolymer derivative (such as alcohol or water) to precipitate the chlorinated derivative which may then be recovered in solid finely divided or crumblike form. It should be noted that the solvent or diluent employed should be one that is liquid at the temperature of reaction, and likewise, the chlorinating agent should be one that liberates free chlorine at the temperature of reaction. When drying the solid product, care must be taken not to overheat the material since excessive heat degrades the chlorinated interpolymer.

A variation of this method consists in utilizing as the solvent or diluent for the chlorination a saturated hydrocarbon or halogenated derivative thereof which boils below room temperature, as in the range −30 to 20° C. such as methyl or ethyl chloride or butane, and carrying out the chlorination at a temperature below 0° C. at a temperature and pressure such that the solvent or diluent is maintained in the liquid state. The use of these materials greatly simplifies recovery of the solvent or diluent since the resulting chlorinated mass may be run into water above the boiling point of the solvent or diluent so that the latter is flashed off and condensed while the chlorinated interpolymer is precipitated or coagulated in a conveniently handled crumb form. In addition, since solid, rubbery, isoolefin-polyolefin interpolymers are generally prepared by polymerization at low temperatures in such a solvent, use of this variation also permits efficient and practical integration of the processes of preparing and chlorinating isoolefin-polyolefin interpolymers.

Another method of carrying out the chlorination consists of passing gaseous chlorine over a solid isoolefin-polyolefin interpolymer in a finely divided form.

Regardless of the particular method employed for effecting the chlorination, it has been found that the chlorination reaction occurs quite readily and essentially involves the addition of chlorine to the olefinic double bonds of the interpolymer. Consequently the resulting chlorine-containing interpolymers possess in their structure units of the formula

These units may well be responsible, at least in part, for the unique properties of the chlorinated interpolymers of this invention. It should be pointed out, however, that some substitution of the chlorine atoms for hydrogen atoms may and probably does occur along with the addition of chlorine to the olefinic double bond during the chlorination reaction and that it is not essential that all of the combined chlorine be present in the

structure, but most of the chlorine present in the chlorinated polymer is in such a structural relation with single substitution of this nature,

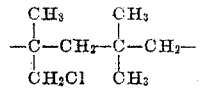

being present only in a minor proportion.

The amount of chlorine which reacts with the interpolymer during the chlorination reaction depends upon the chlorinating agent being used, the method of chlorination, the concentration of the chlorinating agent and the temperature of reaction. When all the other factors are equal, there appears to be an approximate straight line relation between the original concentration of available chlorine and the amount of chlorine present in the chlorinated interpolymer. This is quite advantageous in that the chlorine content of the chlorinated interpolymer can be controlled quite closely simply by regulating the concentration of the chlorinating agent and to some extent, the time of reaction. Control of these variables is quite important since the amount of combined chlorine in the interpolymer has been found to be quite critical to realize the advantages of this invention. When chlorinating in solution in an organic solvent using an initial amount of chlorine less than that required to saturate the interpolymer, it has been observed that about 20 to 60 percent of the theoretical amount of available chlorine reacts with the interpolymer in a short interval of time.

The chlorine-containing interpolymers resulting from the chlorination reaction may contain as little as 0.40 weight percent or as much as 2.3 weight percent of chlorine. Preferably the interpolymers contain from 1.0 to 2.0 weight percent and more preferably from 1.1 to 1.5 weight percent of combined chlorine. For adhesive applications, a slightly higher chlorine content, as high as 2.1 to 2.3 percent may be profitably employed. When concentrations of chlorine higher than about 2.3 percent are employed, the interpolymer loses some of its most desirable properties as a result of polymer degradation. Preferably the percentage of combined chlorine is less than that which would theoretically be present if all of the olefinic double bonds in the interpolymer were completely chlorinated. In chlorinating interpolymers containing low concentrations of unsaturation, it is preferred that the chlorinated interpolymer retain at least about 10 percent of the original unsaturation. The molecular weight of the chlorinated interpolymer of this chlorine content, prepared in the manner indicated, is of about the same order as that of the parent non-chlorinated interpolymer.

As mentioned above, it has been found that the temperature at which the chlorination reaction is conducted is quite critical. The reaction should be conducted under conditions such that the chlorination takes place at a temperature below 0° C. and preferably at or below −20° C. If the reaction is allowed to take place at temperatures above 0° C., the interpolymer is degraded to such a degree that it no longer retains the original properties of the interpolymer and the advantages sought through the use of chlorine are lost. There is some loss in these properties if the chlorination is conducted between −20° C. and 0° C., but this loss is gradual and useful products may be obtained, but when the reaction temperature is above 0° C. the chlorinated products do not possess the valuable properties of the chlorinated interpolymers of this invention regardless of the percentage of combined chlorine. Temperatures in the range of −20° C. to −30° C. are most useful and practical although much lower temperatures such as −100° C. may be employed or even lower temperatures, as −165° C. It is understood that at the lower temperatures the chlorination reaction is slower.

As mentioned hereinbefore, the properties of the chlorine-containing interpolymers of this invention are quite unique. The chlorinated derivatives of solid, plastic, rubbery interpolymers are themselves solid, plastic, rubbery materials which possess the advantages of the parent non-chlorinated materials and in addition are far superior with respect to adhesive properties, ease of vulcanization and various other properties of the vulcanizates. They may be used for all of the purposes for which the non-chlorinated interpolymers are useful, as for example, the manufacture of inner tubes, tire curing bags, etc., and they may be used for various purposes of particular importance in the manufacture of tires and a multitude of other rubber products in which the non-chlorinated materials are unsatisfactory. For example, they may be used as adhesives to bond rubbery materials to each other, being especially useful in bonding non-chlorinated isoolefin-polyolefin interpolymers to each other, to natural rubber and to diene synthetic rubbers. They may also be used quite advantageously in vulcanizable admixtures in any desired proportions with natural rubber and diene synthetic rubbers, imparting many desirable properties including increased resistance to aging and air diffusion to the resulting vulcanizates. In any of these applications they may be compounded with any of the conventional ingredients used in the compounding of non-chlorinated rubbery isoolefin-polyolefin interpolymers or other rubbery materials, and they may be vulcanized by the same general methods. Their vulcanization proceeds much more rapidly than that of non-chlorinated materials, despite their generally lower degree of unsaturation, and they may be vulcanized with agents other than sulfur such as bivalent metal oxides, particularly zinc oxide in the presence of carbon black.

The preparation, properties, compounding, vulcanization and use of the chlorinated interpolymers of this invention are more fully set forth in the following examples which are intended as illustrative only since numerous modifications and variations therein will be apparent to those skilled in the art. In the examples, all parts, unless otherwise specified, are parts by weight.

EXAMPLES 1 TO 5

In these examples chlorine gas is added to a solution of 100 grams of an interpolymer of 97% isobutylene and 3% isoprene dissolved in 1000 grams of solvent. The apparatus employed for the chlorinations is a two liter stainless-steel pressure autoclave fitted with an inlet tube, a stainless-steel needle reaching to the bottom of the autoclave for adding chlorine, a safety pressure disc, an outlet tube equipped with a valve for releasing pressure, and a ¼ inch discharge outlet at the bottom of the autoclave fitted with a globe valve. Chlorine is charged through a 50 ml. syringe from a source of gaseous chlorine, preferably from a weighed cylinder. The chlorine is added to a solution of the interpolymer in solvent during the specified time period and after an additional time period, usually 5 minutes after all of the chlorine is in, the product is neutralized with an equivalent amount of potassium hydroxide dissolved in methanol. A stabilizer which is an epoxidized diester of cotton seed fatty acid is added to the cement and the cement is dumped into hot water (60 to 70° C.) containing about two grams of zinc stearate per 100 grams of polymer and which is being stirred at a rapid rate. The precipitated polymer is filtered on cheese cloth, washed with hot water and dried in a vacuum oven at 55 to 60° C.

*Polymer preparation*

| Example, Number | Solvent | Chlorine, Grams | Reaction Time, Minutes | Temperature, °C. | Chlorine in Polymer, Weight Percent |
| --- | --- | --- | --- | --- | --- |
| 1 | butane | 3.0 | 30 | −20 | 1.10 |
| 2 | do | 3.0 | 75 | −35 | 1.25 |
| 3 | do | 3.0 | 40 | −45 | 1.30 |
| 4 | ethyl chloride | 3.0 | 30 | −5 | 1.50 |
| 5 | butane | 3.0 | 80 | −45 | 1.98 |

The chlorinated interpolymers of Examples 1 through 5 are all solid, plastic, rubbery products. When these materials are placed on a rubber mill they quickly form a smooth sheet, and when pigments are added to the stock they are taken up quickly. When these interpolymers are compounded to the following recipe there is obtained a compounded stock which cures rapidly under the influence of heat and pressure to form vulcanizates of good physical properties.

| Compounding Recipe | Parts by Weight |
| --- | --- |
| Chlorinated interpolymer | 100.0 |
| Easy processing carbon black | 50.0 |
| Zinc oxide | 5.0 |
| Stearic acid | 3.0 |
| Mercaptobenzothiazole | 0.5 |
| Tetramethyl-thiuram disulfide | 1.5 |
| Sulfur | 2.0 |

When the chlorinated interpolymers of Examples 1 through 5 are compounded to the above recipe and cured at 307° F., the following stress-strain properties are obtained on the vulcanizates:

| Example, Number | Optimum Cure, Minutes | 300% Modulus, p. s. i. | Tensile Strength, p. s. i. | Elongation, Percent |
| --- | --- | --- | --- | --- |
| 1 | 30 | 1,050 | 3,100 | 600 |
| 2 | 45 | 1,075 | 3,550 | 650 |
| 3 | 30 | 1,300 | 3,175 | 600 |
| 4 | 75 | 2,100 | 2,725 | 410 |
| 5 | 10 | 850 | 2,575 | 600 |

The vulcanizates of the chlorinated interpolymer exhibit physical properties equivalent to or better than those exhibited by an equivalent non-chlorinated isobutylene-isoprene copolymer.

EXAMPLES 6 TO 10

The chlorinated interpolymers of Examples 1 through 5 are mixed with natural rubber in a ratio of 70 weight parts of chlorinated interpolymer and 30 weight parts of natural rubber, and these mixtures are compounded to the recipe given below and the compounded stocks cured at a temperature of 307° F.

| Compounding Recipe | Parts by Weight |
| --- | --- |
| Polymer mixture | 100.0 |
| Mono and diheptyl diphenylamines | 1.0 |
| Furnace black | 35.0 |
| Zinc oxide | 5.0 |
| Stearic acid | 1.5 |
| Mercaptobenzothiazole | 0.75 |
| Di-ortho-tolyl guanidine | 0.5 |
| Sulfur | 2.25 |

The following stress-strain results are obtained:

| Example, Number | Optimum Cure, Minutes | 300% Modulus, p. s. i. | Tensile Strength, p. s. i. | Elongation, Percent |
| --- | --- | --- | --- | --- |
| 6 | 20 | 1,200 | 1,600 | 425 |
| 7 | 45 | 1,175 | 1,575 | 450 |
| 8 | 30 | 1,450 | 1,650 | 425 |
| 9 | 75 | 1,050 | 1,050 | 300 |
| 10 | 45 | 1,150 | 1,200 | 425 |

The above results are particularly outstanding, first in curing at all and second in the physical properties obtained. When an equivalent isobutylene-isoprene copolymer is mixed with natural rubber in the above ratio and recipe and cured, the mixture for all practical purposes does not cure at all and even after long periods of time the physical properties of the stock are very poor, having tensile strengths of only a few hundred pounds as contrasted with the snappy well cured stocks obtained as shown above.

The natural rubber used in the Examples 6 through 10 above may be replaced by diene synthetic rubbers including polychloroprene, polybutadiene and the like as well as copolymers of chloroprene, isoprene or butadiene with each other or with monoolefinic monomers such as styrene, acrylonitrile, acrylic and methacrylic acids and their alkyl esters, vinyl pyridine, vinylidene chloride and the like with generally equivalent results. This invention includes compositions comprising a chlorinated iso- olefin-polyolefin interpolymer of the type described in admixture in any desired proportion with any other unsaturated vulcanizable rubbery material. Such mixtures may be made by any of those methods known to those skilled in the art such as by mixers; blending dispersions, latices, solutions and the like.

EXAMPLES 11 TO 15

The chlorinated interpolymers of this invention are particularly useful as adhesives for adhering Butyl type rubbers to natural rubber. To illustrate this property, a non-chlorinated vulcanizable Butyl rubber composition and a vulcanizable natural rubber composition are sheeted separately on a rubber mill and coated with a 10% n heptane cement of the chlorinated isoolefin-polyolefin of Example 1, which polymer contains 40 to 50 parts of easy processing channel black, after which the cemented surfaces are pressed together and the assembly vulcanized. This step is repeated with the products of Examples 2, 3, 4 and 5. These assemblies are then tested in a Cooey Autographic Adhesion Tester and the adhesion is expressed in pounds of pull per inch of width between the two compositions required to separate them. The results obtained are:

*Adhesion-Butyl to Natural Rubber*

| Example: | Pounds pull/inch width |
| --- | --- |
| 11 | 7.3 |
| 12 | 5.2 |
| 13 | 6.5 |
| 14 | 5.5 |
| 15 | 8.2 |

When a similar assembly is made without the chlorinated interpolymer cement layer, or a non-chlorinated isoolefin-polyolefin interpolymer is employed, results of about 0.5 pound pull per inch of width are obtained.

When Examples 1 through 5 are repeated with other interpolymers, as copolymers of 96 parts of isobutylene and 4 parts of 1-vinyl-cyclohexene-3, and 95 isobutylene and 5 parts of butadiene-1,3 and the like, similar excellent results are obtained. The rapid cures obtained with the chlorinated interpolymers has already been mentioned. Also quite surprising is the ability of these interpolymers to be cured with a bivalent metal oxide such as zinc oxide in amounts as low as 5 parts or lower without added sulfur or similar curing agents ordinarily required for the vulcanization of Butyl type rubbers. This is of utmost importance since such metal oxides alone will not cure to any degree the non-chlorinated Butyl type rubbers. To obtain optimum cures with a bivalent metal oxide, the use of a carbon black in the compound is particularly advantageous. Amounts from 1 to 100 parts may be employed with amounts from 15 to 75 parts preferred.

From the foregoing description of the invention, it is apparent that chlorinated isoolefin-polyolefin interpolymers of the type described constitute a new and widely useful class of materials. It is further apparent that various embodiments of the invention, in addition to those specifically disclosed may be provided without departing from the spirit and scope of the invention as defined in the appended claims.

We claim:

1. A solid, rubbery, partially chlorinated interpolymer of 90 to 99 weight percent of an isoolefin containing from 4 to 8 carbon atoms and a terminal methylene group with 1 to 10 weight percent of a polyolefin containing 4 to 18 carbon atoms, said chlorinated interpolymer retaining a portion of its original olefinic unsaturation, being essentially undegraded and having essentially the same molecular weight as the parent unchlorinated interpolymer, and containing chlorine in an amount from about 0.4 to about 2.3 weight percent, the chlorine being present in essentially the structure

said chlorinated interpolymer being prepared by reacting said interpolymer with a chlorinating agent in the presence of an organic liquid at a temperature between about —20° C. and —165° C.

2. A solid, rubbery, partially chlorinated interpolymer of 90 to 99 weight percent of isobutylene and 1 to 10 weight percent of an aliphatic conjugated diolefin, said chlorinated interpolymer retaining at least about 10% of its original olefinic unsaturation, being essentially undegraded and having essentially the same molecular weight as the parent unchlorinated interpolymer, and containing chlorine in an amount from about 0.9 to about 2.1 weight percent, the chlorine being present in the chlorinated interpolymer in essentially the structure

said chlorinated interpolymer being prepared by reacting said interpolymer with a chlorinating agent in the presence of an organic liquid selected from the group consisting of hydrocarbons and halogenated derivatives thereof at a temperature between about —20° C. and —165° C.

3. A solid, rubbery, partially chlorinated interpolymer of a monomer mixture containing about 95 to 99 weight percent of isobutylene and 1 to 5 weight percent isoprene, said chlorinated interpolymer retaining at least about 10% of its original olefinic unsaturation, being essentially undegraded and having essentially the same molecular weight as the parent unchlorinated interpolymer, and containing chlorine in an amount from about 1.0 to about 2.0 weight percent, the chlorine being present in the chlorinated interpolymer in essentially the structure

said chlorinated interpolymer being prepared by reacting said interpolymer dissolved in an organic liquid with chlorine at a temperature from about —20° C. to about —100° C.

4. A solid, rubbery, partially chlorinated interpolymer of a monomer mixture containing about 95 to 99 weight percent of isobutylene and about 1 to 5 weight percent isoprene, said chlorinated interpolymer containing at least about 10% of its original olefinic unsaturation, said chlorinated interpolymer containing chlorine in an amount from about 1.0 to about 2.0 weight percent, being essentially undegraded and having essentially the same molecular weight as the parent unchlorinated interpolymer, the chlorine being present in the chlorinated interpolymer in essentially the structure

said chlorinated interpolymer being prepared by reacting said interpolymer dispersed in an organic liquid with chlorine at a temperature from about —20° C. to about —100° C.

5. The solid, rubbery, partially chlorinated interpolymer of claim 3 wherein the monomer mixture contains about 97 weight percent isobutylene and about 3 weight percent isoprene.

6. The solid, rubbery, partially chlorinated interpolymer of claim 4 wherein the monomer mixture contains about 97 weight percent isobutylene and about 3 weight percent isoprene.

7. A solid, rubbery, partially chlorinated interpolymer of a monomer mixture containing about 97 weight percent of isobutylene and about 3 weight percent isoprene, said chlorinated interpolymer containing at least about 10% of its original olefinic unsaturation, said chlorinated interpolymer containing chlorine in an amount from about 1.1 to about 1.5 weight percent, being essentially undegraded and having essentially the same molecular weight as the parent unchlorinated interpolymer, and the chlorine being present in the chlorinated interpolymer in essentially the structure

said chlorinated interpolymer being prepared by reacting said interpolymer dissolved in an organic solvent selected from the group consisting of hydrocarbons and halogenated derivatives thereof with chlorine at a temperature of about —20° C. to about —30° C.

8. A vulcanizable composition comprising natural rubber and a solid, rubbery, partially chlorinated interpolymer of 90 to 99 weight percent of an isoolefin containing from 4 to 8 carbon atoms and a terminal methylene group with 1 to 10 weight percent of a polyolefin containing 4 to 18 carbon atoms, said chlorinated interpolymer retaining a portion of its original olefinic unsaturation, said chlorinated interpolymer containing chlorine in an amount from about 0.4 to about 2.3 weight percent, being essentially undegraded and having essentially the same molecular weight as the parent unchlorinated interpolymer, and the chlorine being present in essentially the structure

said chlorinated interpolymer being prepared by reacting said interpolymer with a chlorinating agent in the presence of an organic liquid at a temperature between about —20° C. and —165° C.

9. A vulcanizable composition comprising a rubbery diene polymer and a solid, rubbery, partially chlorinated interpolymer of 90 to 99 weight percent of an isoolefin containing from 4 to 8 carbon atoms and a terminal methylene group with 1 to 10 weight percent of a polyolefin containing 4 to 18 carbon atoms, said chlorinated interpolymer retaining a portion of its original olefinic unsaturation, said chlorinated interpolymer containing chlorine in an amount from about 0.4 to about 2.3 weight percent, being essentially undegraded and having essentially the same molecular weight as the parent unchlorinated interpolymer, and the chlorine being present in essentially the structure

said chlorinated interpolymer being prepared by reacting said interpolymer with a chlorinating agent in the presence of an organic liquid at a temperature between about —20° C. and —165° C.

10. The method for preparing a partially chlorinated interpolymer of 90 to 99 weight percent of an isoolefin containing from 4 to 8 carbon atoms and a terminal methylene group with 1 to 10 weight percent of a polyolefin containing 4 to 18 carbon atoms, said chlorinated interpolymer retaining a portion of its original olefinic unsaturation, containing chlorine in an amount from about 0.4 to about 2.3 weight percent chlorine, being essentially undegraded and having essentially the same molecular weight as the parent unchlorinated interpolymer, and the chlorine being present in essentially the structure

which comprises preparing a mixture of said isoolefin-polyolefin and an organic liquid, adding to said mixture a sufficient amount of chlorinating agent to add to the interpolymer from 0.4 to 2.3 weight percent of combined chlorine, while retaining a portion of the original olefinic unsaturation, at a temperature between about −20° C. and −165° C.

References Cited in the file of this patent

UNITED STATES PATENTS

| | | |
|---|---|---|
| 2,213,423 | Wiezevich | Sept. 3, 1940 |
| 2,276,874 | Reynolds et al. | Mar. 17, 1942 |
| 2,291,574 | Gleason et al. | July 28, 1942 |
| 2,513,330 | Kaganoff | July 4, 1950 |
| 2,631,984 | Crawford et al. | Mar. 17, 1953 |